(12) United States Patent
Sorg et al.

(10) Patent No.: US 11,603,031 B2
(45) Date of Patent: Mar. 14, 2023

(54) APPARATUS AND HEADLIGHT

(71) Applicant: OSRAM OLED GmbH, Regensburg (DE)

(72) Inventors: Joerg Erich Sorg, Regensburg (DE); Hubert Halbritter, Dietfurt (DE); Georg Bogner, Lappersdorf (DE)

(73) Assignee: OSRAM OLED GMBH, Regensburg (DE)

( * ) Notice: Subject to any disclaimer, the term of this patent is extended or adjusted under 35 U.S.C. 154(b) by 163 days.

(21) Appl. No.: 16/972,637

(22) PCT Filed: Jun. 6, 2019

(86) PCT No.: PCT/EP2019/064850
§ 371 (c)(1),
(2) Date: Dec. 7, 2020

(87) PCT Pub. No.: WO2019/234180
PCT Pub. Date: Dec. 12, 2019

(65) Prior Publication Data
US 2021/0245653 A1    Aug. 12, 2021

(30) Foreign Application Priority Data
Jun. 8, 2018   (DE) .......................... 102018113711.7

(51) Int. Cl.
*B60Q 1/00* (2006.01)
*F21S 41/16* (2018.01)
(Continued)

(52) U.S. Cl.
CPC ............ *B60Q 1/0023* (2013.01); *F21S 41/16* (2018.01); *G01S 7/486* (2013.01); *G01S 17/931* (2020.01); *F21Y 2115/30* (2016.08)

(58) Field of Classification Search
CPC .... B60Q 1/0023; F21S 41/16; F21Y 2115/30; G01S 7/481–489; G01S 17/42; G01S 17/931
See application file for complete search history.

(56) References Cited

U.S. PATENT DOCUMENTS 8,619,241 B2   12/2013  Mimeault
10,222,474 B1 *  3/2019  Raring ................... G01S 7/487
(Continued)

FOREIGN PATENT DOCUMENTS

DE    102016223669 A1   5/2018
DE    102017123798 A1   4/2019

OTHER PUBLICATIONS

International Search Report issued for the corresponding International Application No. PCT/EP2019/064850, dated Sep. 19, 2019, 4 pages (for referential purposes only).

*Primary Examiner* — Jason M Han
(74) *Attorney, Agent, or Firm* — Viering, Jentschura & Partner mbB

(57) ABSTRACT

In one embodiment, an apparatus may include a light source. The apparatus also includes a measuring laser, such as a semiconductor laser. The measuring laser is configured to generate pulses with a maximum pulse duration of 10 ns. A wavelength of maximum intensity of the measuring laser radiation generated by the measuring laser ranges from 400 nm to 485 nm inclusive. The measuring laser radiation is used for distance measurement by means of LIDAR, for example in a car headlight.

20 Claims, 11 Drawing Sheets

(51) Int. Cl.
*G01S 17/931* (2020.01)
*G01S 7/486* (2020.01)
*F21Y 115/30* (2016.01)

(56) References Cited

U.S. PATENT DOCUMENTS

| | | |
|---|---|---|
| 2010/0191418 A1 | 7/2010 | Mimeault et al. |
| 2015/0049326 A1* | 2/2015 | Lundquist ............... G01S 7/483 356/5.01 |
| 2018/0275274 A1* | 9/2018 | Bao ........................ G01S 7/486 |
| 2020/0313399 A1 | 10/2020 | Sorg et al. |

* cited by examiner

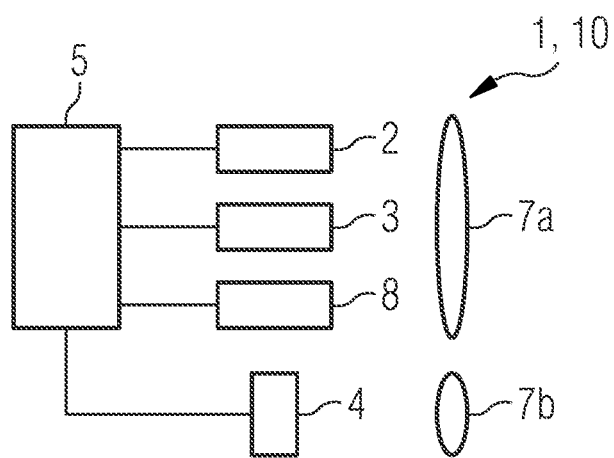
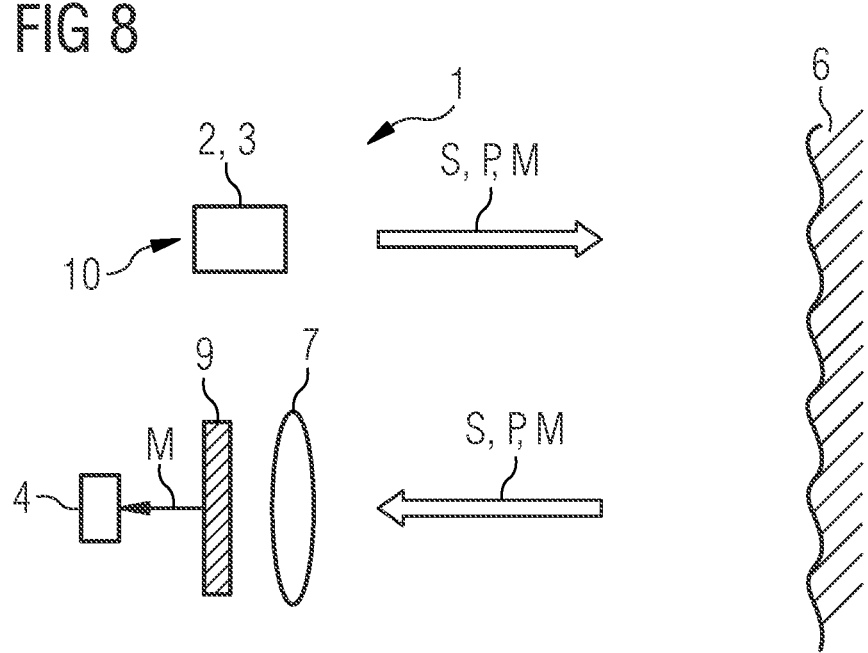

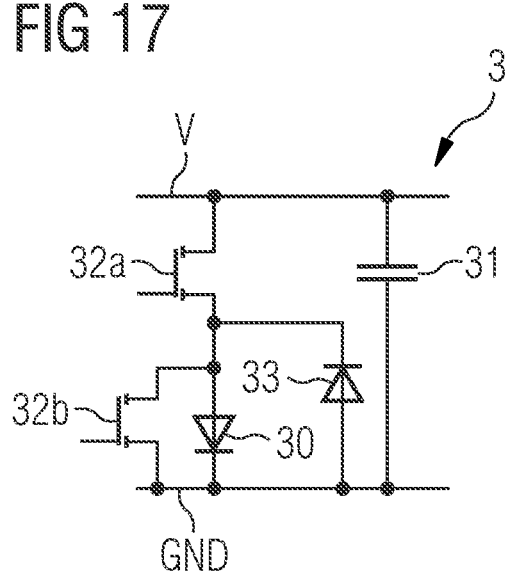
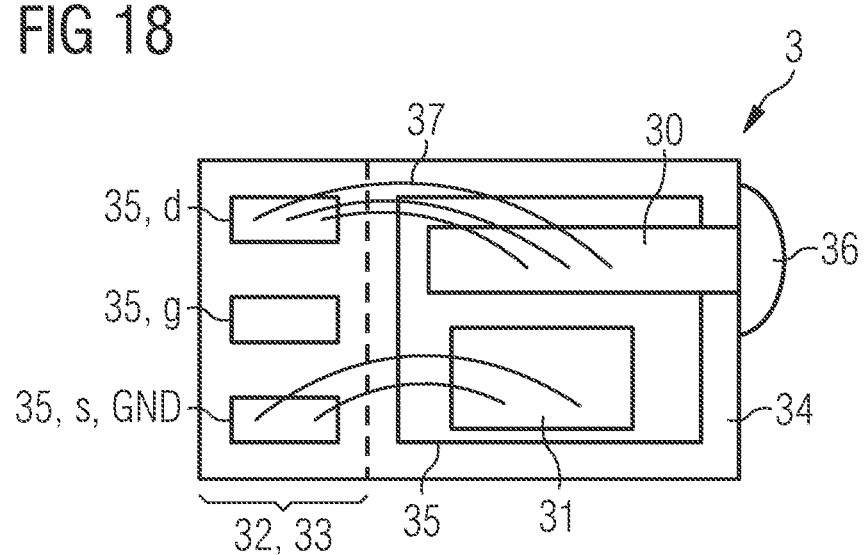

APPARATUS AND HEADLIGHT

CROSS-REFERENCE TO RELATED APPLICATIONS

The present application is a national stage entry according to 35 U.S.C. § 371 of PCT application No.: PCT/EP2019/064850 filed on Jun. 6, 2019; which claims priority to German Patent Application Serial No.: 10 2018 113 711.7 filed on Jun. 8, 2018; all of which are incorporated herein by reference in their entirety and for all purposes.

TECHNICAL FIELD

An apparatus and a headlamp with a measuring laser for distance measurement are specified, wherein the measuring laser emits in the short-wave spectral range.

BACKGROUND

The document U.S. Pat. No. 8,619,241 B2 concerns a distance measuring system with a light emitting diode in the visible spectral range.

An object to be solved is to specify an apparatus and a headlight, which work efficiently with a light source.

SUMMARY

In the apparatus and headlight described here, a semiconductor laser is used which emits in the blue spectral range and is operated in pulsed mode. The semiconductor laser can be attached to a white light emitting light source or be a part of this light source. With the at least temporarily pulsed operated semiconductor laser a distance measurement can be realized by means of a transit time measurement of laser radiation.

According to at least one embodiment, the apparatus comprises a light source. During operation, the light source emits white light and/or near infrared radiation or colored light.

As primary light source the light source comprises a semiconductor light source like at least one light emitting diode or at least one semiconductor laser. The primary light source produces blue light, which is partially converted into secondary radiation. In particular, the secondary radiation is yellow light.

According to at least one embodiment, the apparatus includes a measuring laser. The measuring laser is a semiconductor laser. The measuring laser is configured to generate pulses or pulse trains with a duration of the individual pulses of at most 10 ns, such as of at most 5 ns or 3 ns or 2 ns. A wavelength of maximum intensity of a measuring laser radiation generated by the measuring laser is at least 280 nm or 360 nm or 400 nm or 430 nm and alternatively or additionally at most 505 nm or 485 nm or 460 nm. In a non-limiting embodiment, the wavelength of maximum intensity of the measuring laser is between 430 nm and 460 nm inclusive.

In at least one embodiment, the apparatus includes a light source. In addition, the apparatus includes at least one measuring laser. The measuring laser is a semiconductor laser and is configured to generate pulses with a maximum pulse duration of 10 ns. A wavelength of maximum intensity of measuring laser radiation generated by the measuring laser is between 400 nm and 485 nm inclusive. The measuring laser radiation is used for distance measurement by means of LIDAR, for example in a car headlight.

In other words, the apparatus described here is a headlight for illumination in which a blue emitting semiconductor laser is integrated as a LIDAR component. LIDAR stands for LIght Detection And Ranging, i.e. light-based distance measurement.

Blue-emitting light-emitting diodes, or LEDs for short, are increasingly being used in lighting components such as car headlights. However, the realization of a LIDAR in the blue spectral range based on LEDs is not possible or only possible to a very limited extent. Since LEDs are based on spontaneous emission, pulsed operation with the required operating parameters with pulse durations of 10 ns at most and tuning rates of at least 100 MHz is only possible to a very limited extent. In addition, a spectral narrow-band emission is required for LIDAR functionality in order to achieve a sufficiently high signal-to-noise ratio, or SNR for short, especially in daylight.

Another problem with headlights that use phosphors is that conventional phosphors have too long latency periods of the excitation states, so that light coming from a phosphor exhibits too long pulse durations.

With the apparatus described here, it is possible to integrate a blue-emitting laser component into a headlight as a signal source for a LIDAR system. Thereby, a headlamp component like a blue emitting laser diode can be used to excite the phosphor to support or supplement the phosphor or as a stand-alone LIDAR system. Alternatively or additionally, a blue emission of the LIDAR component, i.e. the measuring laser, is superimposed on the white headlight light in a headlight such as a car headlight. Here, an illumination range of the LIDAR component and the headlight are matched to each other. If necessary, the color locus of the white light source in the headlight is shifted towards lower color temperatures in order to achieve the headlight color locus specified by the standardization. In other words, the additional blue light from the measuring laser is compensated by the fact that the light source itself emits light that appears comparatively red.

In contrast, conventional LIDAR systems, for example for motor vehicles, operate in the infrared wavelength range. Here, an additional IR laser serves as the emission source, which is designed as an edge emitter or vertical emitter, or VCSEL for short.

Thus, laser headlights, additional laser headlights or additional laser components in a headlight can be used as emitters for the LIDAR system described here, which operates in the blue wavelength range. The blue emitting source can be built into white emitting headlights anyway, in order to achieve the excitation of a phosphor and white light by partial conversion. This means that blue-yellow mixed light can be generated. If the primary light source for the phosphor is a laser, high pulse frequencies of 100 MHz and more can be realized.

Furthermore, it is possible to place a blue emitting laser component additionally in the headlight or auxiliary headlight as emitter in order to use it for a LIDAR system.

For LIDAR functionality, radiation in the blue spectral range is possible.

Especially when using an additional, blue-emitting measuring laser, the eye safety of the laser radiation necessary for operation can be ensured in the proposed apparatus, for example by the following steps:

A high efficiency in the detection of blue signals can be achieved with silicon or SiC based sensors. The blue measuring laser radiation comprises a low penetration depth in silicon. Therefore, lower laser powers are sufficient compared to infrared based LIDAR systems.

The apparatus comprises the measuring laser and an optical element in a common housing or enclosure, wherein the measuring laser and the optical element are inseparably connected. This configuration ensures that no unscattered laser light can escape.

The optics used distribute the laser light and adapt the light distribution to the light distribution of the headlight. Optionally, optical elements of the headlight's light source can be used.

Components such as sensors or control circuits based on SiC as semiconductor can be operated at higher temperatures due to the larger band gap of SiC. This offers a better signal-to-noise ratio, especially under short-wave radiation such as X-rays, gamma radiation or ultraviolet radiation.

The optical elements used are, for example, diffractive optical elements, or DOE for short. Meta-optics or multi lens arrays can also be used. Furthermore diffusors can be used. Furthermore, meta-lenses, i.e. lenses made of a metamaterial, can be used. A metamaterial is a material that obtains its optical properties from its inner structure and not from its chemical composition. In particular, a metamaterial comprises structures that are smaller than the wavelength of the radiation for which the meta-lens is constructed. It is also possible to use classical optical elements such as lenses and/or reflectors. The meta-lenses can also include a planar carrier structure, for example a glass wafer on which a structured surface topography is applied. Structure sizes of the applied structures are in the light wavelength range or below the light wavelength. These structures can be planarized by a suitable, also transparent material with a different refractive index. Layer stacks of such structures are also possible.

It is possible that no further measures need to be taken with regard to eye safety for LIDAR applications, since this is already ensured by the other components of the headlight, especially the laser-based light source.

In a non-limiting embodiment, the components measuring laser, an associated capacitor, an associated switching element and/or a control circuit such as an integrated circuit or an ASIC are installed together in one housing in order to keep inductances low at the high frequencies that occur. A corresponding capacitor can, for example, be integrated as a ceramic multilayer in the package or in a carrier, also known as a submount, for the measuring laser. The switching element and/or the drive circuit and/or the capacitor can be integrated in a silicon component or a SiC component, which is an integral part of the package. The measuring laser can be realized as a flip-chip, which allows a wire-bond-free design. Alternatively or additionally the measuring laser can be mounted as a thin film chip, i.e. without a growth substrate for a semiconductor layer sequence, on a carrier.

In particular due to the high optical efficiency of a pure blue LIDAR solution, in contrast to a measuring laser in combination with a phosphor, the at least one measuring laser can be operated at lower currents while providing the same LIDAR power in the blue spectral range. Thus, shorter switching times can be realized. This allows a higher data rate and shorter pulses. In addition, better eye safety can be achieved or reduced eye safety requirements are possible with equivalent performance data of the LIDAR system. Furthermore, smaller laser chips and smaller packages can be used. Alternatively, higher LIDAR performance in the blue spectral range can be achieved with comparable electrical currents. This enables a better SNR. The higher optical efficiency is mainly due to the fact that in this case there is no scattering of the blue light compared to a combination of a blue laser and a phosphor. This enables efficient optics and efficient illumination of a field of view.

The apparatus and headlight described here can be used in particular in a driving assistance system, ADAS for short or Advanced Drive Assistance System. Applications in the LIDAR area and in vehicle to vehicle communication, in short V2V, are also possible.

A complementary system to an IR-LIDAR for increased safety is possible, because a scanning can be done in several wavelength ranges. This allows a redundancy of the distance detection system as a whole and offers an extension of the detection possibilities.

It is possible to detect the condition of a road, for example a surface contour or a covering of water. This enables a higher level of comfort, for example through improved chassis control. The detection of water on a road surface enables increased safety, for example by detecting potential aquaplaning situations.

Furthermore, the apparatus and headlight described here can be used in lane assistants, for distance control and/or collision warning.

The blue, relatively short-wave emission of the measuring laser has a lower penetration depth in silicon detectors compared to infrared radiation. Due to the lower penetration depth into the silicon, a better signal-to-noise ratio can be achieved with a pixelated detector for a given pixel size. Alternatively, a smaller pixel size can be used with the same SNR. This results in a greater design freedom on the detector side with regard to signal sharpness, resolution and installation space.

Receivers or detectors like CMOS cameras have a higher sensitivity in the blue spectral range than in the IR range. This results in a higher efficiency. This is especially due to the fact that detectors with a high time resolution require a thin semiconductor layer sequence. Therefore, when using IR radiation, only a part of the IR radiation is absorbed, whereas blue light can be absorbed almost 100%. Detection can therefore be performed with a lower signal level. Due to the high system efficiency, even lower operating currents are sufficient for operation. With lower operating currents shorter switching times can be realized. This increases the possible data rate and/or spatial resolution.

The apparatus and headlight described here are less susceptible to interference compared to IR-based systems. For example, at low sun, there may be overlapping areas between the emitted IR radiation of a conventional LIDAR system and the solar emission. In contrast, solar radiation in this case has a low blue component, since blue light is strongly attenuated due to Rayleigh scattering in the atmosphere.

By combining complementary LIDAR systems, i.e. infrared and blue, a higher level of security can be achieved. Two differently operating systems, i.e. IR-LIDAR and blue LIDAR, offer a higher degree of redundancy. Furthermore, reflection effects are wavelength-dependent. Due to the different signals from IR-LIDAR and blue LIDAR, additional information can be obtained by a difference observation, for example with regard to a road surface condition.

The increasing demands on the luminance of headlight sources require an increased use of lasers for automotive headlights. In this case, the laser arrangement available for generating the white light can be integrated into the LIDAR architecture. The emission of the overall white emitting LIDAR system with the particularly blue emitting measuring laser contributes to the illumination of a road, for example. Thus, the measuring laser then fulfills two functions, namely as a signal source for the LIDAR functionality and for the illumination of a road in the visible spectral range. This allows cost savings to be achieved.

If the measuring laser from the headlight is used to generate white light with the aid of a phosphor, further measures to ensure eye safety can be dispensed with, so that further cost advantages can be achieved.

In summary, with the apparatus described here and the headlight described here, a higher efficiency can be achieved on the detector side for the detection of blue light compared to the detection of infrared radiation, especially for transit time measurements in cameras or photodiodes. Transit time measurements are also known under the term Time of Flight, short TOF. Due to the dual function, i.e. road illumination on the one hand and distance information as well as depth information of the road on the other hand, costs can be reduced.

Due to the lower penetration depth of blue light in materials such as silicon, a higher selectivity can be achieved. Different penetration depths and/or reflection coefficients of blue light compared to infrared radiation ensure robust distance recognition and detection of the environment in a combined IR-blue system.

According to at least one embodiment an illumination range of the light source is at least 25 m. This means, for example, that for a human observer, sufficient radiation is still reflected from a distance of 25 m to be able to detect objects of road traffic such as pedestrians, cyclists, other motor vehicles or parts of the environment such as trees or roadside barriers. In a non-limiting embodiment, the illumination range is at least 50 m or 100 m or 200 m. Alternatively or additionally, the lighting range is at most 350 m.

According to at least one embodiment, the apparatus comprises at least one sensor and/or at least one electronic unit. The sensor or sensors is or are configured to detect a portion of the measuring laser radiation reflected outside the apparatus by at least one external object with a time resolution of at most 10 ns or 5 ns or 2 ns. The electronic unit measures the reflected and detected part of the measuring laser radiation and thus determines the distance of the object reflecting the measuring laser radiation to the apparatus.

According to at least one embodiment, the light source comprises one or more phosphors. The at least one phosphor is illuminated by one or more primary light sources. In a non-limiting embodiment, the at least one primary light source produces a primary radiation, which is blue light. The primary radiation produces a secondary radiation. In a non-limiting embodiment, the primary radiation is only partially converted into the secondary radiation, so that the light source emits a mixed radiation, which is composed of the primary radiation and the secondary radiation. A proportion of the primary radiation in the mixed radiation is at least 10% or 20% and/or at most 60% or 50%.

According to at least one embodiment, the primary light source is formed by the measuring laser or comprises the measuring laser. It is possible that the measuring laser is combined with other light sources, such as blue emitting light diodes or semiconductor lasers, to excite the phosphor.

According to at least one embodiment, the measuring laser radiation is a part of the primary radiation transmitted by the phosphor. This part of the measuring laser radiation can be scattered by the phosphor. This means that the phosphor can serve as a diffuser for the measuring laser radiation.

According to at least one embodiment, the measuring laser radiation and the mixed radiation illuminate the same or approximately the same solid angle range. This means that the measuring laser radiation is emitted over a comparatively large, contiguous solid angle range. The solid angle range, for example, is at least 0.02 sr or 0.05 sr and/or at most 1 sr. This allows a two-dimensional, simultaneous illumination of a large area, for example a large road area.

According to at least one embodiment the sensor is configured for a spatially resolved detection of the reflected measuring laser radiation. For this purpose the sensor is pixelated. The individual pixels are configured for a high time resolution. A spatial resolution of the distance system, which is formed by the apparatus, is thus not achieved by the measuring laser, but by the sensor.

According to at least one embodiment the primary light source is different from the measuring laser. In this case the measuring laser radiation is led past the phosphor. This means that the measuring laser radiation, starting from the measuring laser, does not reach the phosphor. The measuring laser radiation and the primary light source can be electrically operated and controlled independently of each other.

According to at least one embodiment, the primary light source and the measuring laser emit light of the same maximum and/or dominant wavelength. This applies with a tolerance of at most 50 nm or 15 nm or 10 nm or 5 nm.

According to at least one embodiment, the mixed radiation is colored light. In this case the mixed radiation together with the measuring laser radiation represents white light. The mixed radiation together with the measuring laser radiation meet the values required for automotive headlights with regard to the color locus that is reached and the achievable color rendering.

According to at least one embodiment, the apparatus comprises one or more imaging optics. The at least one imaging optic is for example a lens, such as a converging lens or a lens field. The imaging optics can also be a mirror, like a movable mirror, also called MEMS mirror, to enable scanning with the measuring laser radiation. Imaging optics can be an optical system in which diffuse, refractive and reflective components are combined.

According to at least one embodiment, the imaging optics is arranged downstream of the primary light source and the measuring laser together. The imaging optics can form a common cover and emission surface for the primary light source and the measuring laser.

According to at least one embodiment, the imaging optics is configured to image the measuring laser radiation in a pattern and/or to scan with the measuring laser radiation. For this purpose, the imaging optics may comprise movable components, such as a movable mirror. It is also possible for the imaging optics to comprise apertures and/or masks so that different illumination patterns can be generated with the measuring laser radiation, for example on a roadway or in an environment.

According to at least one embodiment, the imaging optics is inseparably connected to the measuring laser. This means that the measuring laser and the imaging optics do not separate from each other when used as intended.

According to at least one embodiment, the apparatus comprises one or more additional lasers. The at least one further laser emits a different wavelength than the measuring laser. In a non-limiting embodiment, the wavelengths of the measuring laser and the at least one further laser differ by at least 50 nm or 100 nm or 200 nm. If several further lasers are available, these wavelength differences are valid in pairs. The apparatus is especially configured to detect radiation reflected back from an environment by the other laser as well as the measuring laser radiation. By combining lasers with different wavelengths, additional information can be obtained from the wavelength dependence of the reflection properties.

According to at least one embodiment, the apparatus additionally includes an infrared laser. The infrared laser represents the further laser or one of the further lasers. The infrared laser is a semiconductor laser. The infrared laser is configured to generate pulses with a maximum pulse duration of 10 ns or 5 ns or 2 ns. A wavelength of maximum intensity of an infrared radiation produced by the infrared laser is 0.7 µm or 0.8 µm and/or at most 3 µm or 1.7 µm.

According to at least one embodiment, a pulse emission of the infrared laser is synchronized with a pulse emission of the measuring laser. This can mean that the two lasers emit the pulses simultaneously and in synchronism with each other. Alternatively, it is possible that there is a predetermined time interval or a predetermined minimum distance between the pulse emission of the infrared laser and the measuring laser, so that the infrared radiation and the short-wave radiation are not emitted simultaneously, but are emitted with a temporal offset.

According to at least one embodiment, at least one optical element is jointly arranged downstream of the infrared laser and the measuring laser together. Alternatively, the infrared laser and the measuring laser can be equipped with different optical elements or imaging optics.

According to at least one embodiment, the infrared laser can be operated even when the measuring laser is switched off. It is possible that the reverse is also true.

According to at least one embodiment, the infrared laser is configured together with the electronic unit as a safety circuit for the measuring laser. This means in particular that the measuring laser can only be operated if the infrared laser together with the electronic unit determines that there is no person in the illumination range of the measuring laser. In this way an additional eye safety can be achieved.

According to at least one embodiment the sensor is a silicon photodiode, a silicon photodiode array or a CMOS camera. Thus the sensor can comprise several pixels.

According to at least one embodiment, the sensor is configured for at least two different spectral ranges. This is possible, for example, by optical filters which are connected upstream of the sensor and which are each only transmissive for a certain spectral range. For example, there is a filter which is only transmissive in the spectral range of the measuring laser radiation and a filter which is only transmissive in the infrared radiation of the infrared laser.

According to at least one embodiment the measuring laser is an edge-emitting semiconductor laser chip. The semiconductor laser chip is for example a flip chip. Alternatively, electrical contacts of the measuring laser can be located on opposite main sides so that, for example, contacting via bonding wires is possible.

According to at least one embodiment, a capacitor is electrically connected in parallel to the measuring laser. Likewise, a switching element such as a field effect transistor, FET for short, can be present to control the measuring laser, for example electrically connected in parallel.

According to at least one embodiment, the measuring laser, the capacitor and/or the switching element are mounted on a common carrier such as a submount, mounted without a bonding wire. This allows low inductances to be achieved.

According to at least one embodiment the apparatus is a motor vehicle, such as a car, a drone, such as a flying drone, a watercraft, a robot, an actuator or a tool. Furthermore, the apparatus can be used in environmental technology, for example as a sorter for detecting and/or sorting plastic parts from a water stream or an air stream by matching the signals from a UV, blue, IR and/or red based LIDAR-like system.

The measuring laser, optionally together with the light source, can assist an operator of the apparatus.

Alternatively, the apparatus can act automatically and/or autonomously and a detection of the environment is done by LIDAR, based in particular on the measuring laser radiation.

In addition, a headlight is specified. The headlight comprises a light source and a measuring laser, as described in connection with the apparatus. Features of the apparatus are therefore also disclosed for the headlight and vice versa.

In at least one embodiment, the headlight comprises the light source and the measuring laser. The light source comprises at least one phosphor. The phosphor is excited by a primary light source, which produces blue light as primary radiation during operation, to produce secondary radiation. The primary light source is a light emitting diode or a semiconductor laser. The light source emits a mixed radiation, which is composed of the primary radiation and the secondary radiation. The measuring laser is a semiconductor laser and is configured to generate pulses with a maximum pulse duration of 10 ns. A wavelength of maximum intensity of a measuring laser radiation generated by the measuring laser is between 400 nm and 485 nm inclusive. An illumination range of the light source and optionally a measuring distance using the measuring laser radiation is at least 25 m or 100 m or 200 m.

According to at least one embodiment, the primary light source is formed by the measuring laser. The measuring laser radiation is a part of the primary radiation transmitted by the phosphor. The measuring laser radiation together with the secondary radiation is white light.

In the following, an apparatus and a headlight described here are explained in more detail with reference to the drawing using exemplary embodiments. Identical reference signs specify identical elements in the individual Figures. However, no scale references are shown. Rather, individual elements may be shown in exaggerated size for better understanding.

BRIEF DESCRIPTION OF THE DRAWINGS

The accompanying drawings serve to afford an understanding of embodiments. The drawings illustrate embodiments and together with the description serve to elucidate same. Further embodiments and numerous advantages from among those intended are evident directly from the following detailed description. The elements and structures shown in the drawings are not necessarily illustrated in a manner true to scale with respect to one another. Identical reference signs refer to identical or mutually corresponding elements and structures.

FIGS. 1 to 9 show schematic sectional views of exemplary embodiments of the apparatuses described here and the headlights described here, FIGS. 13 to 17 show schematic electrical circuit diagrams for measuring lasers for apparatuses and headlights described here FIG. 18 shows a schematic top view of a circuit arrangement of a semiconductor laser for the apparatuses and headlights described here, and FIGS. 19 to 25 in Figure parts A show schematic sectional views and in Figure parts B schematic top views of circuit arrangements of semiconductor lasers for apparatus and headlights described here.

DETAILED DESCRIPTION

Figure 1:
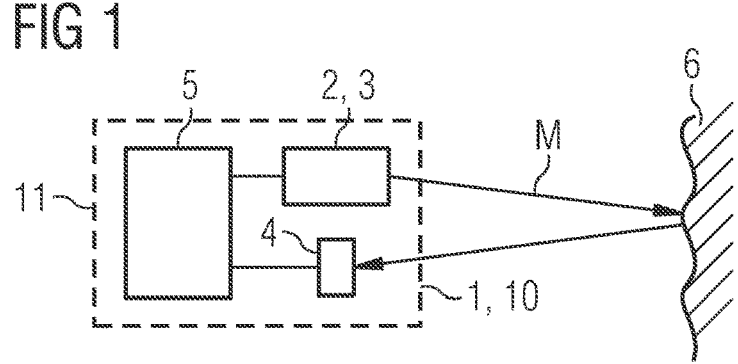

FIG. 1 shows an exemplary embodiment of an apparatus 1. The apparatus 1 is a car headlight 10.

The apparatus 1 comprises a light source 2. The light source 2 emits white light. A measuring laser 3 is integrated in the light source 2. The measuring laser 3 emits a measuring laser radiation M during operation. The measuring laser radiation M is a pulsed laser radiation with a pulse duration of 10 ns at most. The measuring laser radiation M can be divided into individual pulses or into pulse trains, also known as bursts.

Furthermore, the apparatus 1 includes a sensor 4, which detects 6 reflected measuring laser beams M from an object. The object 6 is, for example, another traffic participant.

Furthermore, the apparatus 1 comprises an electronic unit 5, which controls the measuring laser 3 and the sensor 4 as well as optionally the light source 2. The electronic unit 5 contains, for example, one or more integrated circuits and may also comprise memory units as well as data inputs and data outputs.

Via the electronic unit 5, the signals from sensor 4 are evaluated. By measuring the run time of the measuring laser radiation M to the object 6 and back from the object 6, the distance of the apparatus 1 to the object 6 is determined in a time-resolved manner.

The components 2, 3, 4, 5 can be integrated in a common housing 11. Since all components 2, 3, 4, 5 are located in the housing 11, the apparatus 1, especially the headlight 10, can be handled as a single assembly or as a module. This makes it easier to install or replace headlight 10.

Figure 2:
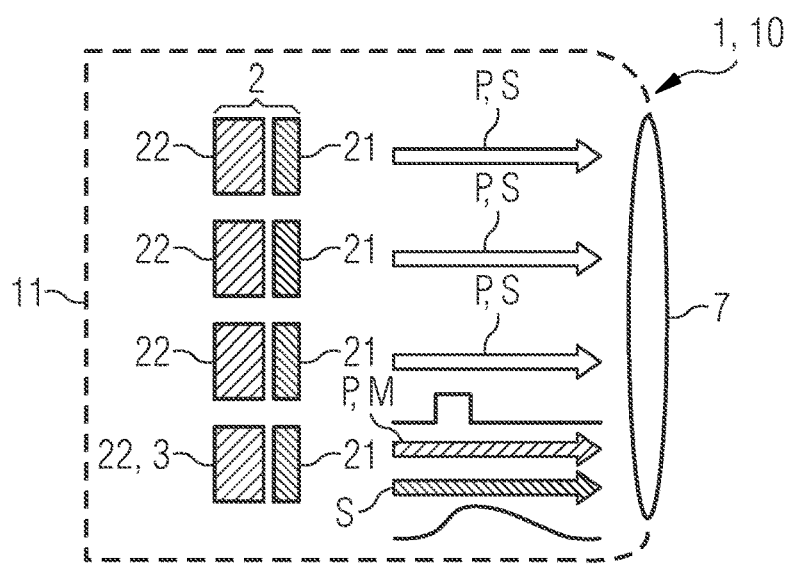

In the exemplary embodiment in FIG. 2, apparatus 1 is also designed as headlight 10, especially as a car headlight. Light source 2 is made up of several primary light sources 22, each of which is followed by a phosphor 21. A primary radiation P is emitted by the primary light sources 22, which is partially converted into a secondary radiation S by the phosphors 21. Thus a mixed radiation is emitted, which is composed of the primary radiation P and the secondary radiation S.

One of the primary light sources 22 simultaneously serves as measuring laser 3, and one of the phosphors 21 is located downstream of the measuring laser 3. The measuring laser radiation M is blue light which is emitted as a short light pulse, for example as an approximately rectangular light pulse. The secondary radiation S is emitted after excitation by the measuring laser radiation M, but with a slight time delay and over a longer period of time. This is symbolized by the time courses of the radiations M, P, S to the measuring laser 3 in FIG. 2.

The primary light sources 22, which are not used as measuring laser 3, may have a different structure than the measuring laser 3 itself. Deviating from the illustration in FIG. 2, there may also be only one primary light source 22 which is also used as measuring laser 3, or there may be measuring laser 3 and only one further primary light source 22.

If the measuring laser 3 and at least one further primary light source 22 are present, the measuring laser 3 emits the measuring laser radiation M in a time window in which the other primary light sources 22 are switched off. If the measuring laser 3 emits the measuring laser radiation M only with a comparatively low repetition rate, for example 50 Hz, so that a measuring time for the measuring laser radiation M is only a small time fraction of, for example, a maximum of 50×1 ms per 1 s, the measuring laser 3 can emit continuously in the remaining time fraction, especially with a low optical output power. The same applies to all other exemplary embodiments.

The housing 11 terminates with a single imaging optics 7, which is arranged downstream of all light sources 22, 3 in common. The imaging optics 7 define an illumination range, also known as the field of view.

The apparatus 1, as shown in FIG. 2, for example, is a low beam or a high beam in a motor vehicle. The headlight can also be an adaptive front light, or AFS for short. The same is possible for all other exemplary embodiments.

The apparatus 1 of FIG. 2 can optionally include the sensor 4 and the electronic unit 5, not shown. The components 4, 5 can be mounted outside or also inside the housing 11. Thus, it is possible that the headlight 10 itself does not include the sensor 4 and optionally does not include the electronic unit 5.

Figure 3:
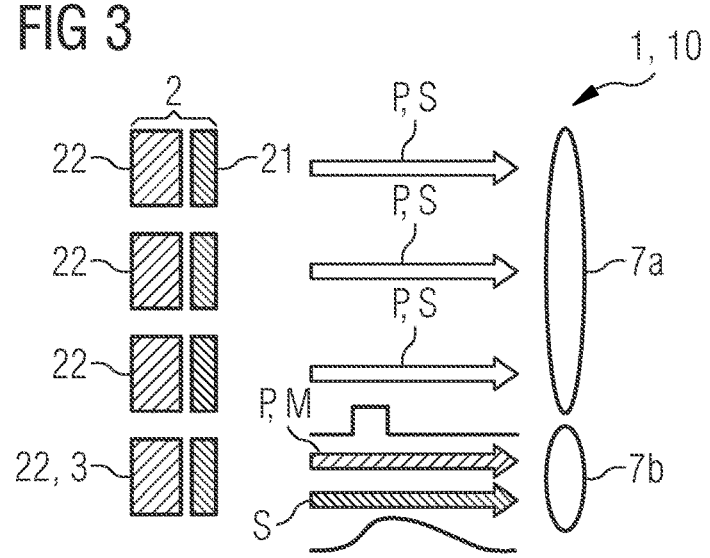

FIG. 3 illustrates that the imaging optics are divided into two optics 7a, 7b. Optics 7a are used for imaging the primary light sources 22, each of which is followed by the phosphor 21. The imaging optics 7b serves as the sole optics for the measuring laser 3. In contrast to the illustration in FIG. 3, it is possible that the imaging optics 7a is arranged downstream of all light sources 22, 3 and the imaging optics 7b.

For the rest, the exemplary embodiment in FIG. 3 corresponds to that in FIG. 2.

The optics 7, 7a, 7b can each be formed by refractive and/or reflective optics.

Figure 4:
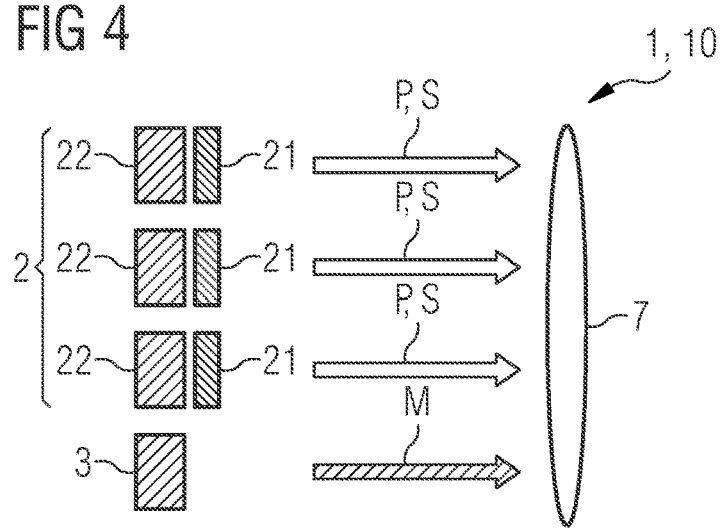

In the exemplary embodiment shown in FIG. 4, no phosphor 21 is arranged downstream of the measuring laser 3. The measuring laser radiation M shines past the phosphors 21. Thus the measuring laser 3 is not part of the light source 2, but independent of the light source 2. As in FIG. 2, the imaging optics 7 can be arranged downstream of the light sources 22, 3 together.

The mixed radiation P, S together with the measuring laser radiation M forms white light.

Figure 5:
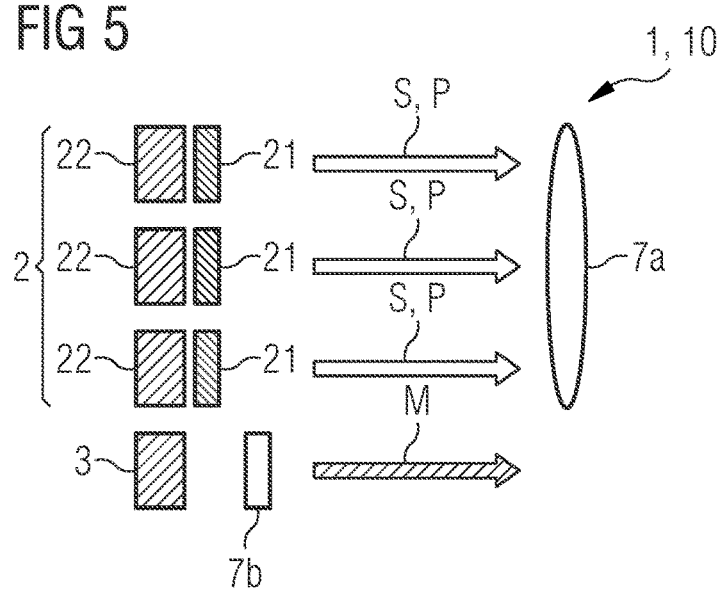

FIG. 5 illustrates that a separate optical system 7b is provided for the measuring laser 3. Optics 7b is a lens, such as a converging lens, or a movable mirror, for example a MEMS mirror.

For the rest, the exemplary embodiments of FIGS. 4 and 5 correspond to those of FIGS. 2 and 3.

Figure 6:
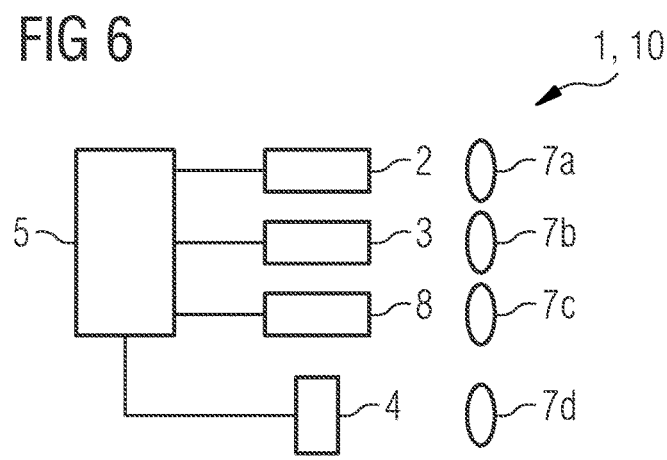

FIG. 6 illustrates that the apparatus 1 and/or the headlight 10 additionally include an infrared laser 8. In addition, separate optics 7a, 7b, 7c, 7d may be provided for each of the radiation-emitting components 2, 3, 8 and for the sensor 4.

FIG. 7 illustrates that the common optics 7a is arranged downstream of the radiation-emitting components 2, 3, 8. The sensor 4 is optically preceded by the imaging optics 7b.

For the rest, the explanations given in FIGS. 6 and 7 with regard to the light sources 2, 3, apply to FIG. 1 and FIGS. 2 to 5.

Figure 9:
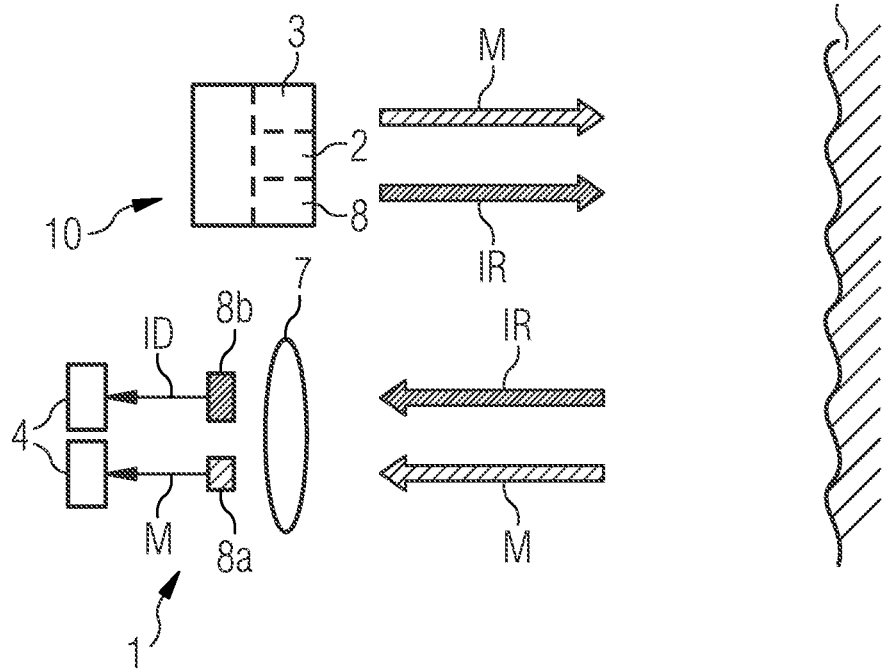

FIGS. 8 and 9 illustrate the detection of reflected radiation. Radiation M, P, S are emitted by headlight 10 and partially reflected by object 6. The sensor 4 of the apparatus 1, which is arranged separately from the headlight 10, is preceded by the imaging optics 7 and a filter 9.

Only the measuring laser radiation M passes through the filter 9 to the sensor 4. The radiations P, S are filtered out. Thus it is possible that the primary radiation P comprises a different wavelength than the measuring laser radiation M to allow spectral filtering. Alternatively, the measuring laser radiation M and the primary radiation P may comprise the same wavelength and a filtering is performed in the time domain. This is especially true if the primary light source is used as a measuring laser, see FIGS. 2 and 3.

According to FIG. 9 the headlight 10 emits the infrared radiation IR and the measuring laser radiation M. The e.g. white light of the light source 2 is not drawn.

The sensor 4 is pixelated and locally sensitive for the infrared radiation IR and the measuring laser radiation M by means of the filters 8a, 8b. A sensitivity separation is thus performed by the filters 8a, 8b.

According to FIGS. 8 and 9 a spatial resolution with respect to the measuring laser radiation M and optionally the infrared radiation R is achieved by the sensor 4. Sensor 4 is pixelated accordingly to ensure a spatial assignment of the locally detected radiation M, IR.

Such pixelated sensors 4 and optionally the use of the additional infrared laser 8 is also possible in all other exemplary embodiments.

The sensor 4 is for example a silicon photodiode, a silicon photodiode array or a CMOS Time of Flight camera.

Deviating from the illustration in FIG. 9, it is possible that each of the filters 8a, 8b is assigned its own imaging optics. In this case there is no common imaging optics 7, which is illustrated in FIG. 9.

Figure 10:
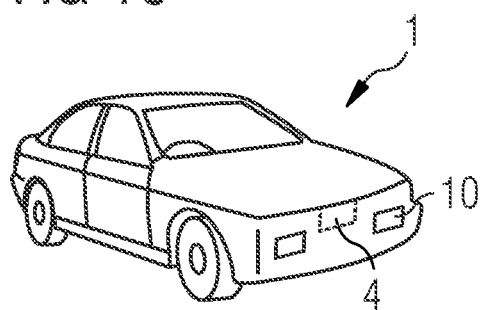
FIGS. 10 to 12 show schematic diagrams of exemplary embodiments of the apparatuses described here.

FIG. 10 illustrates that apparatus 1 is a car. The apparatus 1 has several of the headlights 10 with the light sources 2, 3 and optionally with the infrared laser 8. The sensor 4 can be arranged separately from the headlights 10 or it can be a part of the headlight 10, different from FIG. 10.

Figure 11:
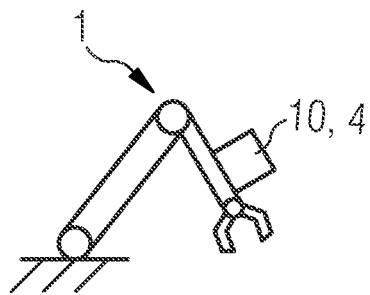

According to FIG. 11, the apparatus 1 is a gripper arm or a robot arm. The headlight 10 and optionally the sensor 4 can be mounted on a tip of the gripper arm.

Figure 12:
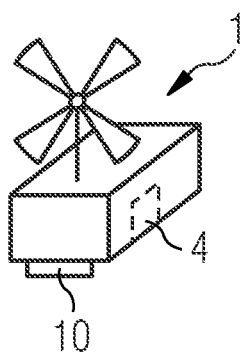

In the exemplary embodiment shown in FIG. 12, apparatus 1 is a flying drone. The apparatus 1 includes the headlight 10 and optionally the sensor 4, which can also be integrated in the headlight 10, in contrast to the illustration in FIG. 12.

FIGS. 13 to 17 show exemplary circuit diagrams for the control of the measuring laser 3. In FIGS. 13 to 17, one capacitor 31 is electrically connected in parallel to each semiconductor laser diode 30 of measuring laser 3. Optionally, there can be another capacitor 31 electrically connected in series with the laser diode 30.

Furthermore, a switching element 32 is connected in series with the laser diode 30. The switching element 32 is a field effect transistor, FET for short, especially based on SiC, GaN or Si. If the switching element 32 is connected to a supply voltage V, it is for example a p-MOS-FET, see FIGS. 13 and 15. If the switching element 32 is connected to an earth connection line GND, the switching element 32 is an n-MOS-FET, see FIGS. 14 and 16.

Figure 15:
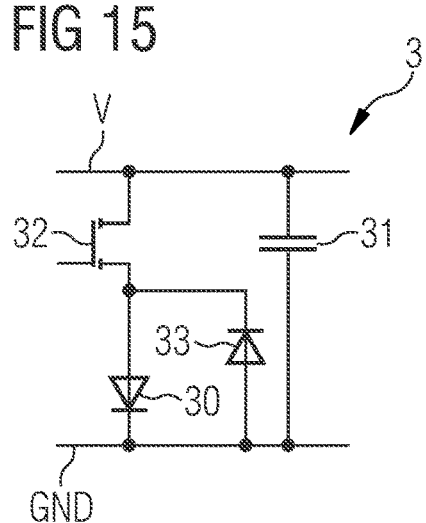
Figure 16:
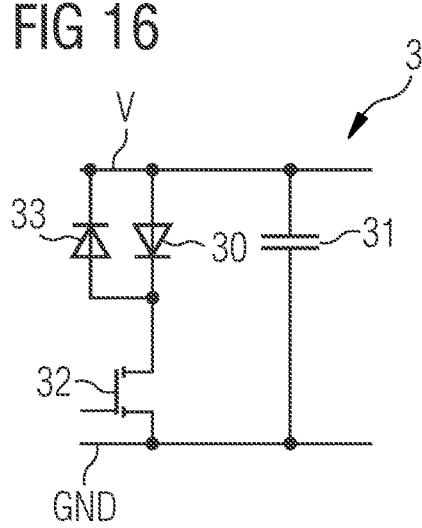

FIGS. 15 and 16 illustrate that a protective diode 33 can be connected antiparallel to the laser diode 30. The protection diode 33 is a diode for protection against damage caused by electrostatic discharge, in short ESD diode.

FIG. 17 illustrates that a parallel connected switching element 32b may be present in addition to the switching element 32a connected in series with the laser diode 30. The switching element 32b can be used to quickly switch off the laser diode 30 and thus shorten the pulse duration.

A conductor loop within the circuit arrangement, as shown in FIGS. 13 to 17, is as small as possible so that an area and volume are as small as possible. This allows low inductances to be achieved to ensure short switching and control times. In a non-limiting embodiment, components 30, 31, 32 and optionally 33 are integrated in a common housing, not drawn.

FIG. 18 illustrates that a carrier 34 is provided for measuring laser 3, on which the laser diode 30 and the capacitor 31 are mounted on a common contact surface 35. The switching element 32 and optionally the protective diode 33 are integrated in the carrier 34. The switching element 32 is designed as FET. An electrical connection of the laser diode 30 and the capacitor 31 is made via several bonding wires 37 each to ensure low inductances.

The capacitor 31 is for example a silicon chip capacitor or a capacitor of type 0102 or similar. To control the switching element 32 electrical contact surfaces 35, d, and 35, g as well as 35, s, GND for drain, gate as well as source=GND can be provided. On an underside of carrier 34, which is not drawn, corresponding contact surfaces can be present.

It is possible that on a facet of the laser diode 30 there is a facet encapsulation 36, which can be lenticular. The facet encapsulation 36 is only schematically drawn in a simplified form. For example, the facet encapsulation 36 is designed as described in document DE 10 2017 123 798 A1. The disclosure content of this document is included hereby by reference.

The carrier 34 is a substrate like a printed circuit board, PCB for short, or a metal core board. The carrier 34 can also be a ceramic substrate with conductor tracks or an embedded leadframe. Furthermore, carrier 34 can be a Si submount.

As an alternative to the illustration in FIG. 18, it is possible to use a wire-bond-free contact in order to further reduce electrical inductances of the leads.

Figure 13:
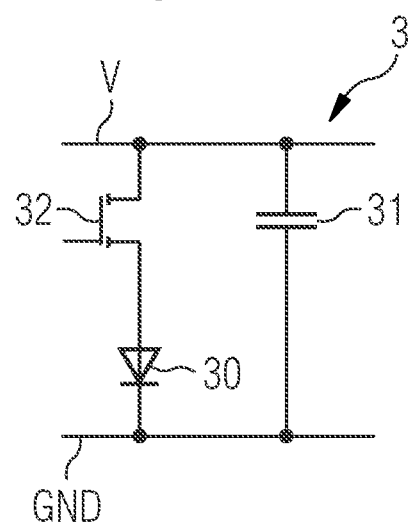
Figure 14:
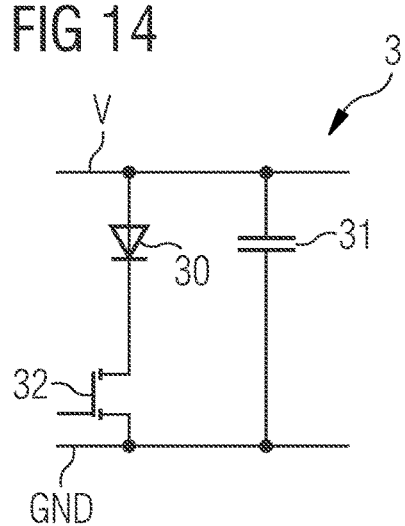

FIGS. 19 to 25 illustrate further exemplary embodiments of circuit arrangements for measuring laser 3, analogous to FIG. 18, with the circuitry following the circuit diagram shown in FIG. 13. In the same way, however, the circuit diagrams in FIGS. 14 to 17 can be used. In Figure parts A, as far as they are available in the corresponding Figure parts B at all, bonding wires are not drawn, nor are the contact surfaces. It is possible that the measuring laser 3 consists only of the laser diode 30 or that it comprises the carrier 34 and all components carried by it.

Figure 19A:
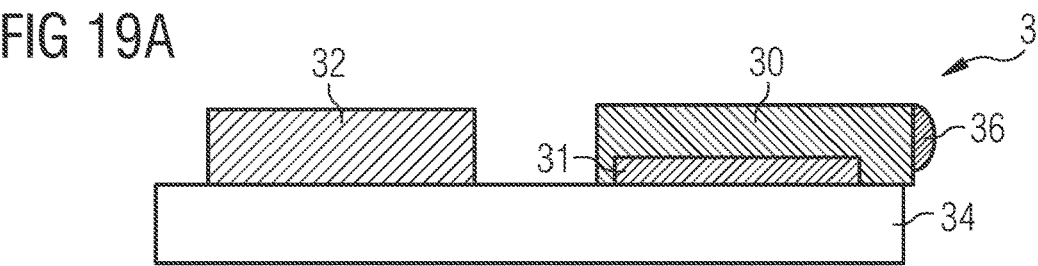
Figure 19B:
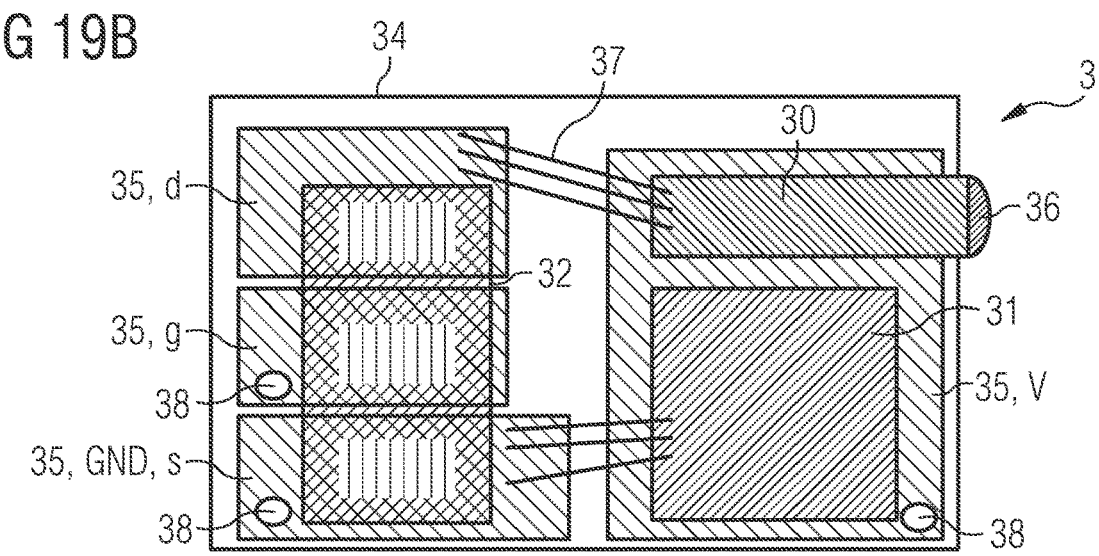

According to FIG. 19, carrier 34 is a substrate with contact surfaces 35, for example a printed circuit board, or PCB for short, a ceramic carrier or a lead frame. The switching element 32 is a FET and/or an ASIC and is based on Si, GaN or SiC. A local hermetic encapsulation of the laser diode 30 can be achieved via the facet encapsulation 36.

The contact surface 35, g for the gate connection as well as the contact surface 35, GND, s for the source connection and the contact surface 35, V for the supply voltage connection are connected via electrical contact surfaces 38 with corresponding contact surfaces on a carrier underside, not drawn. The laser diode 30 is connected via several bonding wires 37 to the contact surface 35, d for the drain connection of the switching element 32. The capacitor 31 is located on the contact surface 35, V and is also connected via several bonding wires 37 to the contact surface 35, GND, s.

Figure 20A:
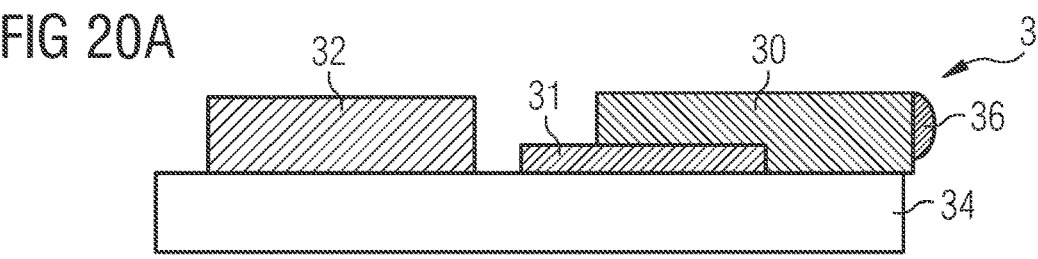
Figure 20B:
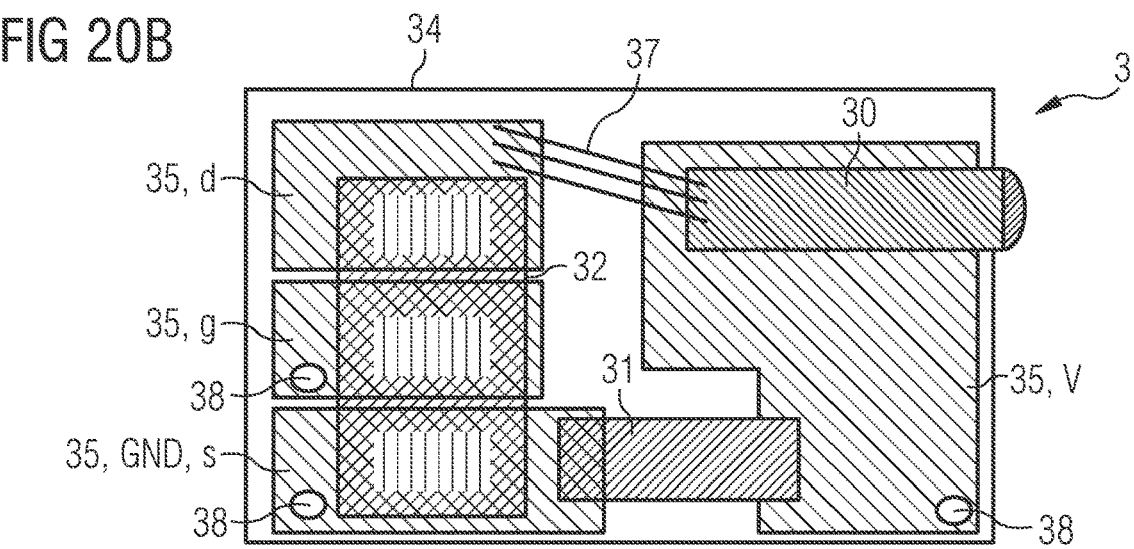
Figure 21A:
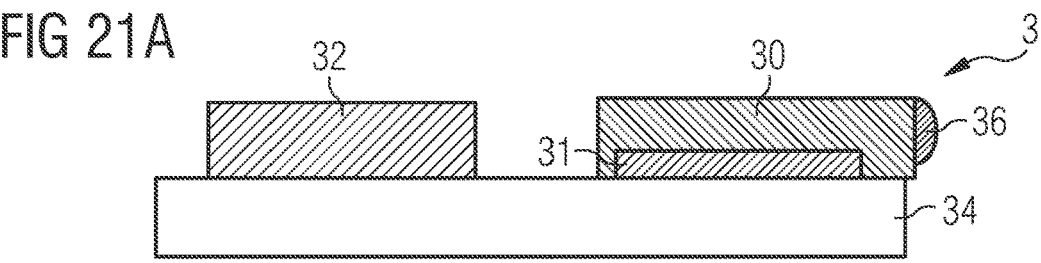
Figure 21B:
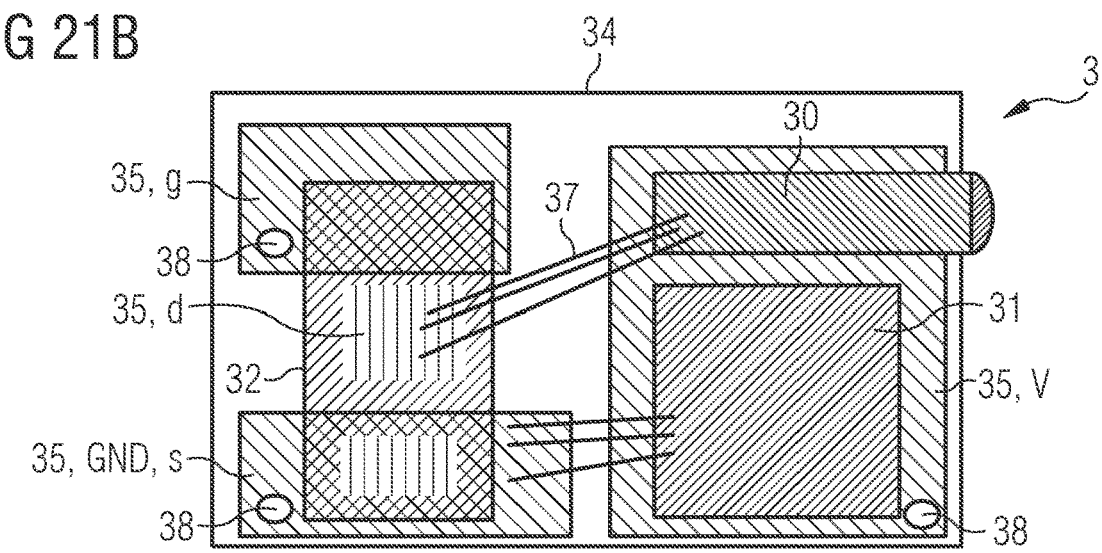

Contrary to FIG. 19, in FIG. 20 the capacitor 31 is a flip chip, so that the capacitor 31 is directly connected to the contact pads 35, GND, s and 35, V without bonding wires. Contrary to FIG. 19, FIG. 21 shows the contact surface 35, d in top view between the contact surfaces 35, g and 35, GND, s. The contact surface 35, d is located on a side of switching element 32 facing away from carrier 34.

Figure 22A:
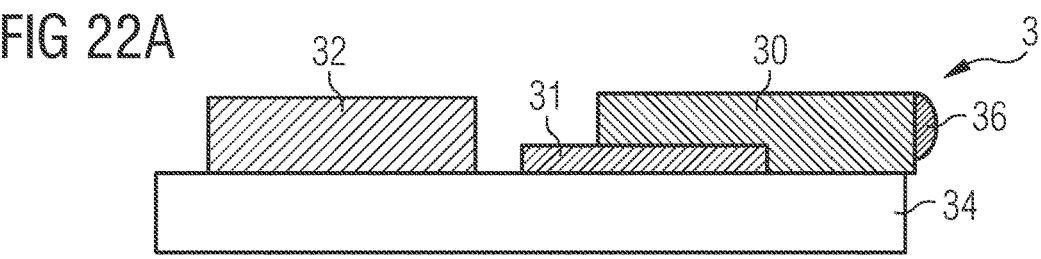
Figure 22B:
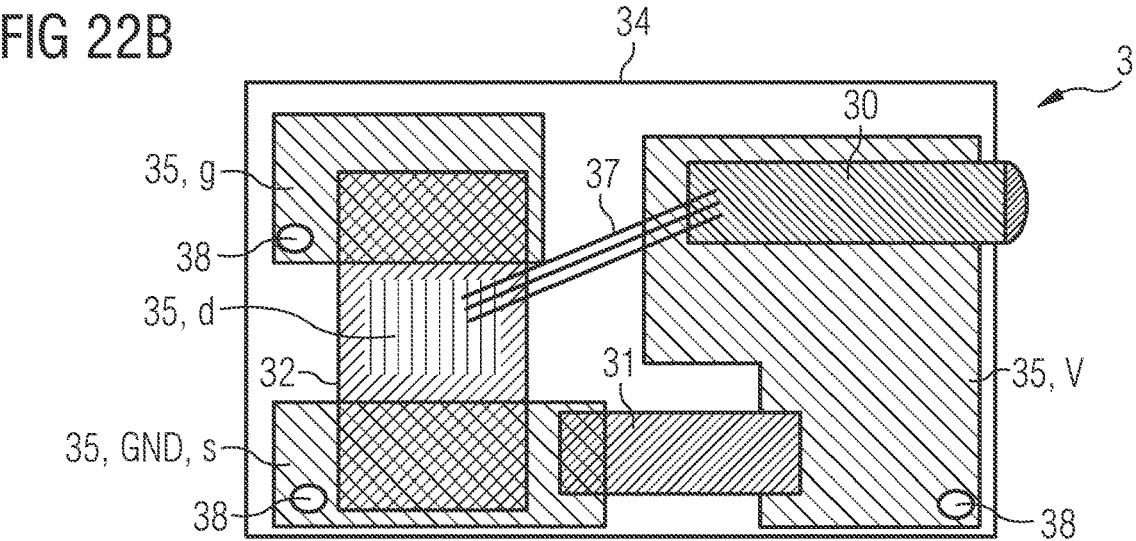

The arrangement of FIG. 22 corresponds to a combination of FIGS. 20 and 21.

Figure 23A:
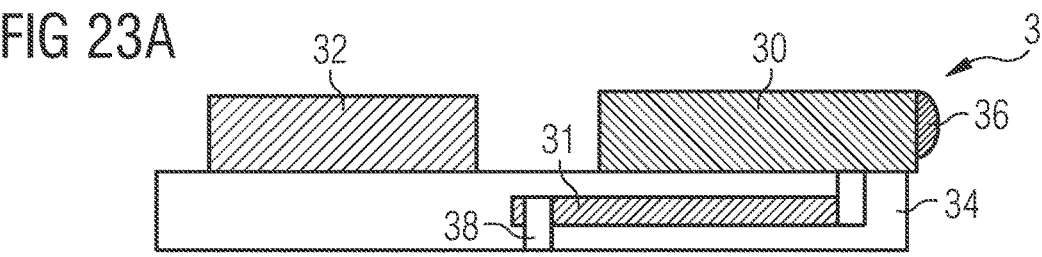
Figure 23B:
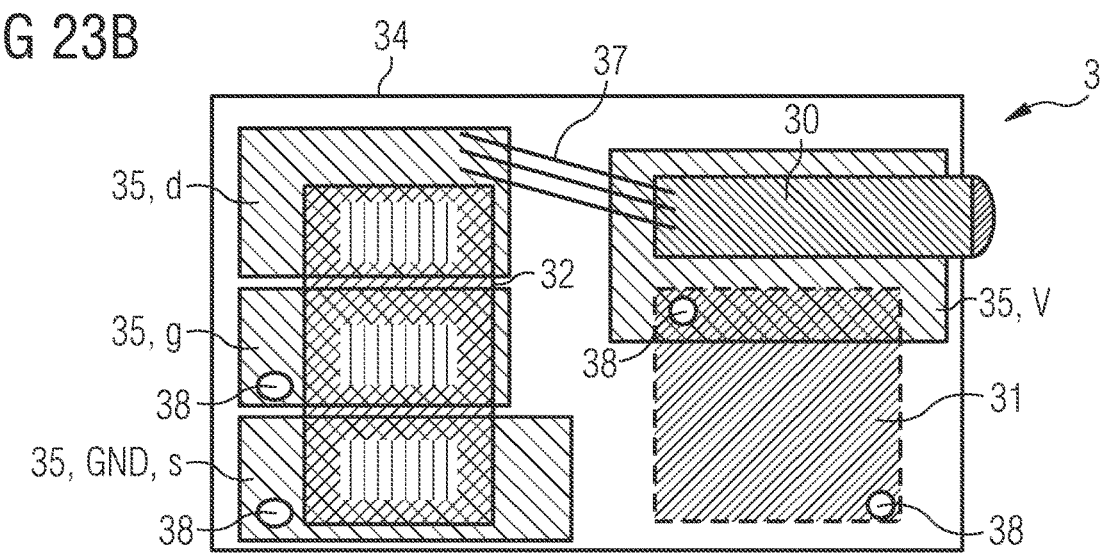

In the exemplary embodiment of FIG. 23, the capacitor 31 is integrated in the carrier 34. The carrier 34 is designed as a multilayer ceramic. The capacitor 31 is electrically connected via vias 38. For the rest, the example in FIG. 23 corresponds to that in FIG. 19.

Figure 24A:
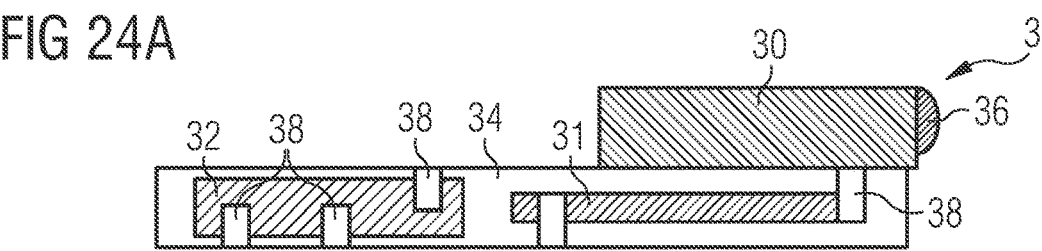
Figure 24B:
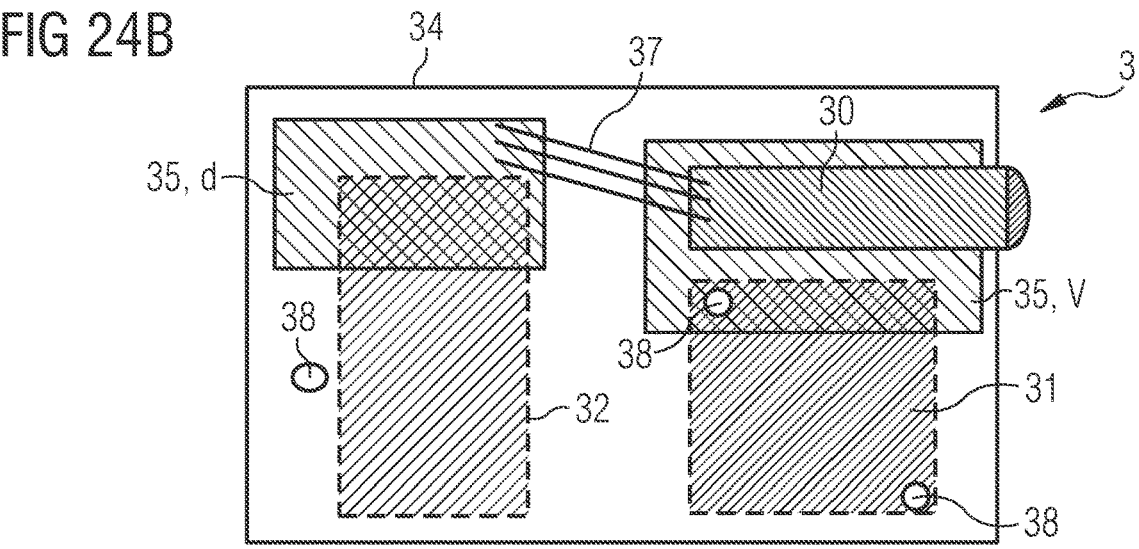

According to FIG. 24, the switching element 32 is also integrated in carrier 34 and connected via the vias 38. Only contact surfaces 35, d and 35, V are located on the upper side of carrier 34. The remaining, undrawn contact surfaces are located on the underside of carrier 34.

Figure 25A:
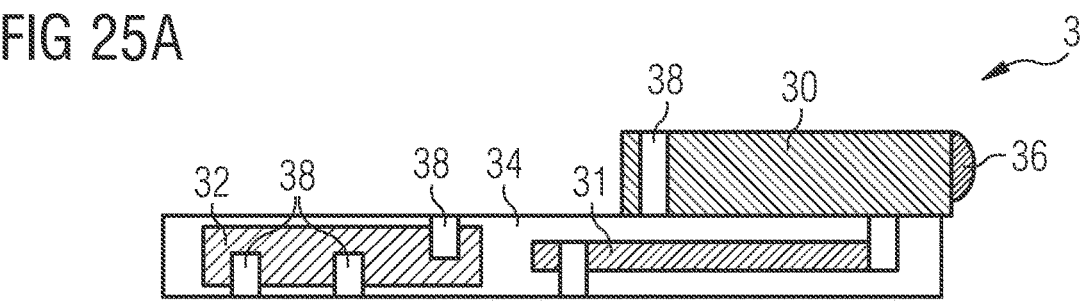
Figure 25B:
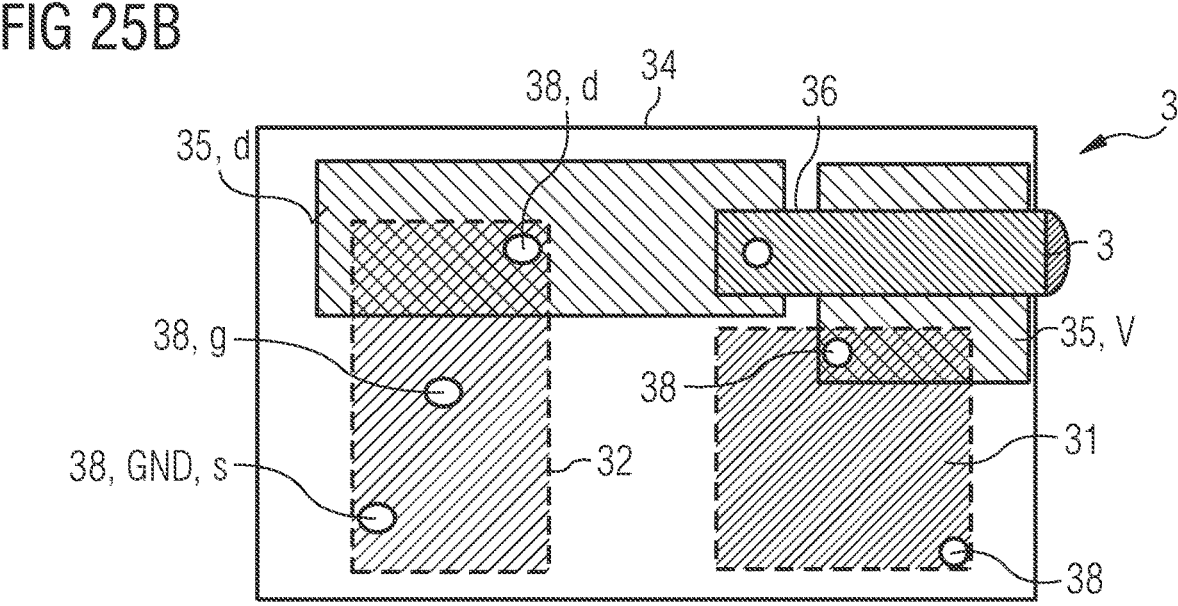

In the exemplary embodiment of FIG. 25 the laser diode 30 is contacted without any bonding wire. For this purpose, a via 38 is created in and/or at a semiconductor layer sequence of the laser diode 30, so that the semiconductor layer sequence is electrically connected on two sides. Otherwise, the explanations in connection with FIG. 24 apply.

Unless otherwise indicated, the components shown in the Figures follow each other directly in the order given. Layers not touching each other in the Figures are spaced apart. If lines are drawn parallel to each other, the corresponding surfaces are aligned parallel to each other. Likewise, unless otherwise indicated, the relative positions of the drawn components to each other are correctly shown in the Figures.

This patent application claims the priority of the German patent application 10 2018 113 711.7, the disclosure content of which is hereby incorporated by reference.

The invention described here is not limited by the description using the exemplary embodiments. Rather, the invention comprises each new feature as well as each combination of features, which in particular includes each combination of features in the claims, even if this feature or combination itself is not explicitly specified in the claims or exemplary embodiments.

LIST OF REFERENCE SIGNS 1 apparatus
10 headlight
11 housing
2 light source
21 phosphor
22 primary light source
3 measuring laser
30 laser diode
31 capacitor
32 switching element
33 protective diode
34 carrier
35 contact surface
36 facet encapsulation/lens
37 bonding wire
38 via
4 sensor
5 electronic unit
6 reflecting object
7 imaging optics
8 infrared laser
9 filter
d drain connection
g gate connection
GND earth connection
IR infrared radiation
M measuring laser radiation
P primary radiation
S secondary radiation
s source connection
V supply voltage

The invention claimed is:

1. An apparatus comprising:
a light source;
at least one measuring laser;
wherein the measuring laser is a semiconductor laser and is configured to generate pulses with a pulse duration of at most 10 ns;
a wavelength of maximum intensity of a measuring laser radiation generated by the measuring laser ranges from 400 nm to 485 nm inclusive.

2. The apparatus according to claim 1, wherein:
the light source is configured to produce white light;
an illumination range of the light source is at least 25 m;
further comprising at least one sensor and an electronic unit;
wherein the sensor is configured to detect a portion of the measuring laser radiation reflected outside the apparatus at an external object with a time resolution of at most 5 ns,
wherein the electronic unit is configured to determine a transit time of the reflected and detected portion of the measuring laser radiation; and
wherein the pulse duration is at most 5 ns.

3. The apparatus according to claim 2, wherein:
the light source comprises at least one phosphor;
the phosphor is configured to be excited by a primary light source;
wherein the primary light source is configured to produce blue light as primary radiation,
wherein the phosphor is configured to produce secondary radiation;
the light source is configured to emit a mixed radiation composed of the primary radiation and the secondary radiation.

4. The apparatus according to claim 3, wherein:
the primary light source is formed by the measuring laser; and
the measuring laser radiation is a portion of the primary radiation transmitted through the phosphor.

5. The apparatus according to claim 4, wherein: the measuring laser radiation and the mixed radiation illuminate the same solid angle range; and
the sensor is configured for spatially resolved detection of the reflected measuring laser radiation.

6. The apparatus according to claim 3, wherein:
the primary light source is a semiconductor laser configured to emit blue light;
the primary light source is different from the measuring laser; and
the measuring laser radiation is guided past the phosphor.

7. The apparatus according to claim 6, wherein:
the primary light source and the measuring laser are configured to emit light of the same maximum wavelength with a tolerance of at most 10 nm;
the mixed radiation is colored light; and
the mixed radiation and the measuring laser radiation are white light.

8. The apparatus according to claim 6, wherein:
the apparatus comprises an imaging optics; and
the imaging optics are arranged downstream of the primary light source and the measuring laser.

9. The apparatus according to claim 1, wherein:
the apparatus comprises at least one imaging optics; and
the imaging optics is configured to image the measuring laser radiation in a pattern and/or to scan with the measuring laser radiation.

10. The apparatus according to claim 9, wherein:
the imaging optics are inseparably connected to the measuring laser; and
the imaging optics comprises a lens, a reflector, a diffractive optical element, a meta-lens, a multi-lens field, and/or a diffuser.

11. The apparatus according to claim 1,
further comprising an infrared laser;
wherein the infrared laser is a semiconductor laser and is configured to generate pulses with a pulse duration of at most 10 ns;
a maximum intensity wavelength of infrared radiation produced by the infrared laser ranges from 0.7 µm to 3 µm inclusive; and
a pulse emission of the infrared laser is configured to be synchronized with the measuring laser.

12. The apparatus according to claim 11, wherein:
the infrared laser and the measuring laser have at least one optical element arranged downstream; and
the infrared laser is configured to be operated when the measuring laser is switched off.

13. The apparatus according to claim 11, wherein:
the infrared laser and the electronic unit are configured as a safety circuit for the measuring laser; and
the measuring laser is operated when it has been determined that no persons are located in an illumination area of the measuring laser.

14. The apparatus according to claim 1, wherein:
the sensor is a Si photodiode, a Si photodiode array, or a CMOS camera; and
the sensor is configured to have at least two different spectral ranges.

15. The apparatus according to claim 1, wherein:
the measuring laser is an edge-emitting flip chip,
a capacitor is electrically connected in parallel with a series connection of the measuring laser and a switching element; and
the measuring laser, the capacitor, the switching element, or combinations thereof are mounted on a common carrier in the absence of bonding wires.

16. The apparatus according to claim 1,
wherein the apparatus is a motor vehicle, a drone, a robot, an actuator, or a tool.

17. The apparatus according to claim 1, further comprising an infrared laser, and wherein a maximum intensity wavelength of infrared radiation produced by the infrared laser ranges from 0.7 µm to 3 µm inclusive.

18. The apparatus according to claim 1, further comprising an infrared laser, and wherein a pulse emission of the infrared laser is configured to be synchronized with the measuring laser.

19. A headlight comprising:
a light source; and
a measuring laser; wherein:
the light source comprises at least one phosphor;
the phosphor is configured to be excited by a primary light source; wherein the primary light source is configured to produce blue light as primary radiation, wherein the phosphor is configured to produce secondary radiation;
the primary light source is a light emitting diode or a semiconductor laser;
the light source is configured to emit a mixed radiation comprising the primary radiation and the secondary radiation;
the measuring laser is a semiconductor laser and is configured to generate pulses with a pulse duration of at most 10 ns;
a wavelength of maximum intensity of a measuring laser radiation generated by the measuring laser ranging from 400 nm to 485 nm inclusive; and
an illumination range of the light source is at least 25 m.

20. The headlight according to claim 19,
wherein
the primary light source is formed by the measuring laser;
the measuring laser radiation is a portion of the primary radiation transmitted through the phosphor; and
the measuring laser radiation and the secondary radiation are white light.

* * * * *